Feb. 20, 1951
C. E. KEY
2,542,776
ARTIFICIAL BAIT BODY
Filed Jan. 26, 1950
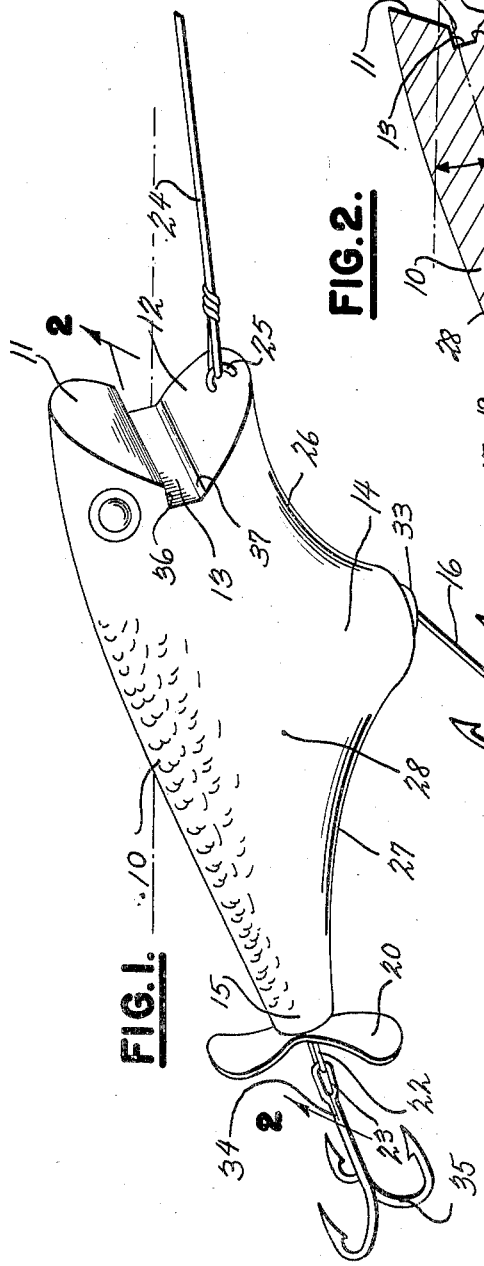
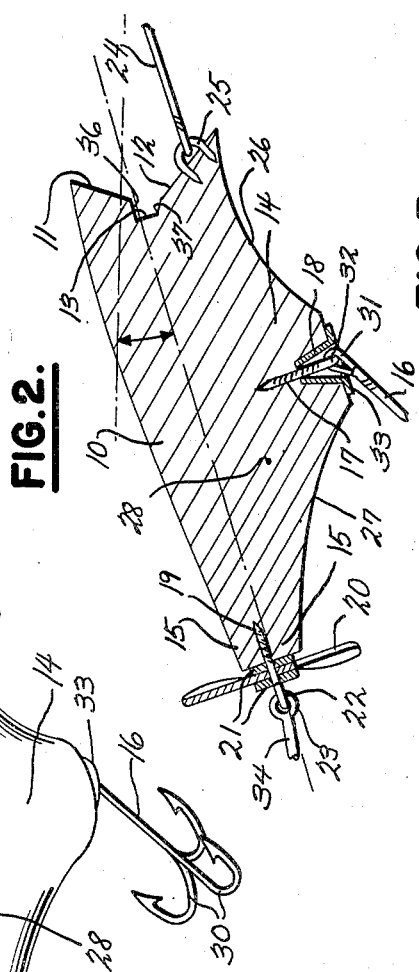
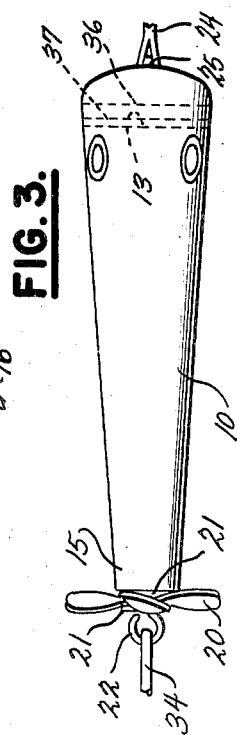
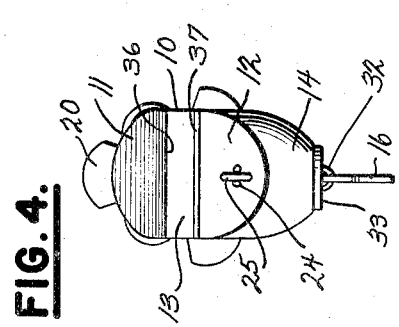
INVENTOR
CLYDE E. KEY
BY *Mawhinney & Mawhinney*
ATTORNEYS Patented Feb. 20, 1951

2,542,776

UNITED STATES PATENT OFFICE 2,542,776

ARTIFICIAL BAIT BODY

Clyde E. Key, Arkadelphia, Ark.

Application January 26, 1950, Serial No. 140,622

1 Claim. (Cl. 43—42.48)

The present invention relates to improvements in artificial bait body and has for an object to provide a body resembling that of a pot-bellied crippled minnow which when drawn through the water will set up wide ripple waves attracting the nearby fish and enticing pursuit.

Another object of the present invention is to provide a bait body which when cast into a stream will assume an angle of declination resembling a smaller fish attempting to catch surface insects thereby leaving itself vulnerable to attack from the lower rear.

A still further object of the present invention is to provide a bait body simple in construction permitting of economic manufacture having a spinner, tail and belly hooks.

With the foregoing and other objects in view, the invention will be more fully described hereinafter, and will be more particularly pointed out in the claim appended hereto.

In the drawings, wherein like symbols refer to like or corresponding parts throughout the several views, Figure 1 is a perspective view of the improved artificial bait constructed in accordance with the present invention being drawn through the water, Figure 2 is a longitudinal vertical section of the improved artificial bait body showing the hook and spinner attaching members, Figure 3 is a top plan view of the improved artificial bait body, and Figure 4 is a front elevational view of the improved artificial bait body.

Referring more particularly to the drawings, 10 designates a bait body of wood or other suitable material shaped to conform generally to the external configuration of a crippled minnow and painted in the color pattern of the type of minnow it is intended to represent.

At its fore end the body is provided with widespread upper and lower lips 11 and 12 which converge rearwardly to a mouth recess having a flat rear wall 13. The body 10 from a side elevational aspect is formed with a dropped enlarged pot-belly portion 14 intermediate the length of the body. The lower portion of the body is defined by semi-parabolic curves 26 and 27 to opposite sides of the dropped belly 14. The forward curve 26 is incurved from the forward edge of the belly 14 up to the lower edge of the lower lip 12. The rear curve 27 extends from the rear edge of the belly 14 to the lower portion of the tail 15. The focus and directrix of the curve 27 is of a higher value than the curve 26 resulting in the fact that the curve 27 has a broader sweep, while the forward curve 26 has a sharper arc penetrating deeper upwardly into the body 10 between the points 14 and 12.

The upper portion of the body 10 forming the back of the fish is transversely rounded.

Viewed from top plan, as illustrated in Figure 3, the body 10 is transversely wider at its fore end tapering rearwardly to the tail 15 and having the general appearance of a truncated triangle.

The shank 16 of a hook cluster 30 is provided with an eye 31 which is swivelly secured to a complemental eye 32 on the lower projecting end of a fastening 17, such as a nail or screw. This fastening 17 penetrates the wood or other material of the body 10, the fastening 17 being introduced from the bottom of the body approximately centrally of the belly 14 and the lower portion of the fastening 17 is enveloped and protected by a frustoconical ferrule 18 having an out-turned annular flange 33 fitted up against the lower wall of the belly 14 around the recess made to receive the ferrule 18.

Inserted into the body 10 approximately centrally of its longitudinal axis and at the aft or tail end 15 is a fastening, such as a screw or nail 19 having a smooth bearing portion extending beyond the tail 15 to rotatably receive a spinner 20 which may consist of the three blades as shown. Washers 21 are freely fitted upon the bearing portion of the fastening 19 at opposite sides of the spinner 20. At the rearmost end of the fastening 19 is an eye 22 with which is swivelly engaged an eye 23 of a shank 34 of the hook cluster 35.

A staple 25 fixed in the lower lip 12 accommodates the fishing line 24 by which the lure may be drawn through the water.

The bait body with the applied hooks and spinner will have a center of mass or a center of gravity indicated generally at 28.

It will also be noted that the upper longitudinal edge of the bait body 10 is generally convexly curved to simulate the upper contour of the minnow.

It will be noted from Figure 4 that the upper edge of the upper lip 11 and the lower edge of the lower lip 12 are both convexly rounded in a transverse sense.

It will be noted from Figure 2 that the plane face of the lower lip 12 from its free rounded edge to its upper straight edge adjoining the mouth recess is longer and of greater area than the similar length and area of the upper lip 11.

It will also be noted from Figure 2 that the upper inner edge of the lower lip 12 is set longitudinally back of the lower inner edge of the upper lip 11. Moreover whereas the top wall 36 of the mouth recess is at substantially right angles with the rear flat wall 13, the lower wall 37 is inclined on an obtuse angle with respect to the plane of the rear wall 13 and such bottom wall 37 is at a different inclination than the inclination of the lower lip 12.

In operation, when the lure is thrown into the water without any tension on the fishing line 24, the same will assume an inclined or diagonal position with the head uppermost and the body 10 inclining downwardly from the head toward the tail. This is due to the fact that the center of gravity 28 is offset rearwardly of the longitudinal center of the body 10. A pull upon the line 24 will tend to rotate the body 10 about this center of gravity 28 to bring the body more nearly to a horizontal position. However the body is so constructed and weighted that under normal pull of the fishing line 24 as in trolling the body will assume substantially the position shown in Figure 1, namely in that inclined position which simulates a minnow ascending to the surface for the purpose of feeding upon surface insects. As pulled along by the fishing line 24, the hook cluster 30, 35 will trail in the manner indicated in Figure 1 and the spinner 20 will be rotated due to the reaction of the slipstream against the inclined blades. This spinner in itself constitutes an attractive lure to larger fish and the crippled minnow form of the body 10, tinted or painted as indicated also invites attack from predatory fish.

As the minnow is drawn through the water by the line 24 the slipstream reacting on the lower lip 12 will cause relatively large masses of the water to impinge against the upright flat wall 13 of the mouth recess which will react to set up ripples in the water which on account of this flat wall and the substantial lateral length thereof, such ripples will be propagated over a very large area to both sides of the minnow. Such broad ripples will set up sonar impulses and also visual impulses attracting the attention of fish in the nearby area and enticing pursuit. It is preferred also that the lower wall 37 of the mouth recess be inclined as indicated in order to avoid a sharp edge over which this ripple producing water moves to the rear flat wall 13. Moreover the slipstream striking the inclined lip 12 tends to cause the head of the bait to rotate downwardly to preserve the minnow in the proper diagonal position. If the minnow is drawn too rapidly through the water the oppositely inclined upper lip 11 reacting against the water or against so much of the water as encounters the area of the upper lip 11 will tend to raise the head of the minnow and counteract too great lowering of the head of the minnow to avoid the horizontal position of the body 10.

It will be noted that the head of the minnow is the widest portion of the lure which is generally contrary to marine construction natural or man made and this enlargement is for the very purpose of creating the broad ripples as above described.

The improved bait has been found in practice to be highly successful with bass.

The forward incurved part 26 exposes the belly 14 to the slipstream as the lure is drawn through the water whereby the body 10 tends to orient itself to the desired inclination, and the water displaced by the belly 14 flows in against the aft incurved part 27 to tend to lift the tail portion for the same reason so that the incurved parts and belly 14 by virtue of their relationship cooperate to maintain the minnow at a preselected angle of inclination, to which result the inclined lips 11 and 12 also contribute.

Although I have disclosed herein the best form of the invention known to me at this time, I reserve the right to all such modifications and changes as may come within the scope of the following claim.

What I claim is:

An artificial bait as herein described comprising a bait body in the form of a minnow having a dropped belly intermediate its ends with incurved parts fore and aft of said belly, a head at the fore end of said body having rearwardly-convergent lips, and a mouth recess between the rear ends of the convergent lips, said recess having a rear substantially flat wall substantially normal to the direction of motion of the bait when pulled by a fishing line, the rear end of the lower lip being offset rearwardly from the rear end of the upper lip, said recess having a lower inclined wall joining the lower lip, a hook device carried by said body, and a fishing line attached to said head.

CLYDE E. KEY.

REFERENCES CITED

The following references are of record in the file of this patent:

UNITED STATES PATENTS

| Number | Name | Date |
| --- | --- | --- |
| 1,616,485 | Carter | Feb. 8, 1927 |
| 1,876,275 | Cummins | Sept. 6, 1932 |
| 2,439,621 | Himottu | Apr. 13, 1948 |
| 2,459,288 | Robbins et al. | Jan. 18, 1949 |
| 2,499,718 | Boshears | Mar. 7, 1950 |